(12) United States Patent
Kobayashi et al.

(10) Patent No.: US 11,752,965 B2
(45) Date of Patent: Sep. 12, 2023

(54) SIDE AIRBAG DEVICE AND METHOD FOR MANUFACTURING SIDE AIRBAG DEVICE

(71) Applicant: Autoliv Development AB, Vargarda (SE)

(72) Inventors: Yuto Kobayashi, Kanagawa (JP); Hiroyuki Shima, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 111 days.

(21) Appl. No.: 17/595,480

(22) PCT Filed: Mar. 24, 2020

(86) PCT No.: PCT/JP2020/013166
§ 371 (c)(1),
(2) Date: Nov. 17, 2021

(87) PCT Pub. No.: WO2020/241020
PCT Pub. Date: Dec. 3, 2020

(65) Prior Publication Data
US 2022/0227326 A1   Jul. 21, 2022

(30) Foreign Application Priority Data

May 31, 2019   (JP) .................................. 2019-102145
Feb. 12, 2020  (JP) .................................. 2020-021736

(51) Int. Cl.
*B60R 21/207*   (2006.01)
*B60N 2/58*     (2006.01)
*B60R 21/237*   (2006.01)

(52) U.S. Cl.
CPC ............. *B60R 21/207* (2013.01); *B60N 2/58* (2013.01); *B60R 21/237* (2013.01); *B60N 2002/5808* (2013.01)

(58) Field of Classification Search
CPC ....... B60R 21/207; B60R 21/237; B60N 2/58; B60N 2002/5808
See application file for complete search history.

(56) References Cited

U.S. PATENT DOCUMENTS 10,259,418 B2 *   4/2019   Schuler ................. B60R 21/237
10,343,638 B2 *   7/2019   Fukawatase .......... B60R 21/233
(Continued)

FOREIGN PATENT DOCUMENTS

CN      107848483 A    3/2018
EP      3127758 A1     2/2017
(Continued)

OTHER PUBLICATIONS

English translation of Office Action received in corresponding Chinese application 2021522659 dated Apr. 28, 2023.

*Primary Examiner* — Faye M Fleming
(74) *Attorney, Agent, or Firm* — Harness, Dickey & Pierce, P.L.C.; Stephen T. Olson

(57) ABSTRACT

A side airbag device that is stowed inside a vehicle seat and protects an occupant seated in the seat, including an airbag that restrains the occupant by expanding and deploying, and an inflator that supplies expansion gas to the airbag. The airbag includes a pre-push chamber that contains the inflator inside and deploys mainly on the occupant side (inside), and a main chamber that is connected to the pre-push chamber and deploys mainly toward the front of the vehicle. When the airbag is in the stowed state, the pre-push chamber forms the first folded part and the main chamber forms the second folded part. At the portion where the first folded part and the second folded part overlap, a sewn part joins the first folded part and at least a portion of the pre-chamber, and the sewn part is configured to break during deployment of the airbag.

19 Claims, 14 Drawing Sheets

(56) References Cited

U.S. PATENT DOCUMENTS

| | | | |
|---|---|---|---|
| 10,766,450 B2* | 9/2020 | Hatakeyama | B60R 21/237 |
| 11,214,223 B2* | 1/2022 | Kobayashi | B60R 21/217 |
| 11,254,276 B2* | 2/2022 | Kobayashi | B60R 21/23138 |
| 11,491,947 B2* | 11/2022 | Kanayama | B60R 21/237 |
| 2016/0031406 A1 | 2/2016 | Yamanaka et al. | |
| 2022/0055570 A1* | 2/2022 | Kobayashi | B60R 21/215 |
| 2022/0402455 A1* | 12/2022 | Kobayashi | B60N 2/68 |

FOREIGN PATENT DOCUMENTS

| | | | | |
|---|---|---|---|---|
| JP | 7-205750 A | | 8/1995 | |
| JP | 2005-14862 A | | 1/2005 | |
| JP | 2008247212 A | | 10/2008 | |
| JP | 2009-023494 A | | 2/2009 | |
| JP | 2009-255706 A | | 11/2009 | |
| JP | 2011-121469 A | | 6/2011 | |
| JP | 2015-182513 A | | 10/2015 | |
| JP | 2016-22872 A | | 2/2016 | |
| JP | 2016030538 A | | 3/2016 | |
| JP | 2016037287 A | | 3/2016 | |
| JP | 2016-124382 A | | 7/2016 | |
| JP | 2022133976 A | * | 9/2022 | B60R 21/207 |
| WO | 2017/010169 A1 | | 1/2017 | |

* cited by examiner

A1-A1 cross section

A3-A3 cross section

A4-A4 Cross Section

SIDE AIRBAG DEVICE AND METHOD FOR MANUFACTURING SIDE AIRBAG DEVICE

TECHNICAL FIELD

The present invention relates to a side airbag device installed in a vehicle seat and a manufacturing method thereof.

BACKGROUND TECHNOLOGY

In order to protect passengers in the event of a vehicle collision, it is well known that vehicles are equipped with one or a plurality of airbags. These airbags include, for example, various forms such as: a so-called driver airbag which expands from near the center of the steering wheel of an automobile so as to protect a driver; a curtain airbag which deploys downward along an inner side of a window of an automobile so as to protect passengers during collisions in a lateral direction of the vehicle, as well as when overturning and during rollover accidents; and a side airbag stored in a side port of a seat which is deployed between the passenger and a side panel so as to protect the passenger upon impact in the lateral direction of the vehicle. The present invention relates to a side airbag device.

The side airbag device described in Patent Document 1 below is provided with a main airbag which expands and deploys at the front of the vehicle based on gas from an inflator to protect an occupant and an auxiliary airbag which starts inflating prior to the main airbag and moves the occupant towards the inside of the vehicle. The presence of the main airbag and the supplementary airbag is said to ensure the restraint of the occupant in a confined space and to improve the protection performance of the occupant. Note that there are other inventions apart from the invention described in Patent Document 1 of a side airbag device provided with an auxiliary airbag in addition to a main airbag.

Herein, the side airbag device is stowed in a side supporting part of a seat. Therefore, there are many restrictions on the shape and size, and thus the airbag device packaging must be compact. Also, ensuring that the airbag is deployed reliably and quickly is an important issue.

However, in a side airbag system with a main airbag and an auxiliary airbag, the auxiliary airbag, which starts to deploy first, may disturb the posture of the main airbag and adversely affect the deployment behavior of the main airbag.

When the main airbag and the auxiliary airbag are separately folded and stowed, a cover may be used to cover the entire airbag since the two folded bag masses tend to separate, which makes handling as an airbag module inconvenient. However, the provision of a cover as a separate member is inconvenient due to complications in the manufacturing process and an increase in costs.

PRIOR ART DOCUMENTS

Patent Documents

Patent Document 1: Japanese Unexamined Patent Application Publication No. 2009-023494

SUMMARY OF THE INVENTION

Problem to be Solved by the Invention

In light of the situation described above, an object of the present invention is to provide a side airbag device capable of improving the deployment speed of an airbag and a manufacturing method thereof.

Another object of the present invention is to provide a side airbag device capable of promoting an appropriate deployment behavior of the airbag and a method of manufacturing the same. In particular, the object is to provide a side airbag device capable of securely restraining an occupant with optimal deployment behavior without reducing the deployment speed of the airbag, and a manufacturing method thereof.

A further object of the present invention is to provide a side airbag device which is easy to handle, and a manufacturing method thereof.

Means for Solving the Problems

The present invention is a side airbag device that is housed inside a vehicle seat and protects an occupant seated in the seat, comprising: an airbag that restrains the occupant by expanding and deploying; and an inflator that supplies expansion gas to the airbag. The airbag includes a pre-push chamber with the inflator stowed inside and a main chamber that is connected to the pre-push chamber and deploys toward the front of the vehicle. When the airbag is in the housed state, a first folded part is formed by the main chamber and a second folded part is formed by the pre-push chamber. At the portion where the first folded part and the second folded part overlap, a sewn part is formed that joins the first folded part and at least a portion of the pre-chamber, and the sewn part is configured to break during deployment of the airbag.

Another aspect of the present invention is a method of manufacturing a side airbag device that is housed inside a vehicle seat and protects an occupant seated in the seat, comprising the steps: a step of preparing a pre-push chamber that houses an inflator therein and a main chamber that is connected to the pre-push chamber and deploys toward the front of the vehicle; a step of forming a first folded part of the main chamber; a step of forming a second folded part of the pre-push chamber; and a step of forming a sewn part that joins both folded parts at a portion where the first folded part and the second folded part overlap. The sewn part is configured to break during deployment of the airbag.

In the present invention as described above, a breakable sewn part is formed at the overlapping portion between the first folded part formed mainly by the main chamber and the second folded part formed mainly by the pre-push chamber so that the first folded part and the second folded part are connected before the airbag operates and so that both folded parts do not come apart and are easy to handle without using a cover or the like that surrounds the entire airbag.

In the early stages of airbag deployment, the main chamber will remain connected to the pre-push chamber until the main chamber begins to deploy. As a result, the relative posture (positional relationship) of the chambers and their positional relationship with the bracket and the like can be favorably maintained. For example, in an airbag that utilizes a bracket as a reaction force surface, the position of the airbag relative to the bracket can be properly maintained and the reaction force surface can be effectively utilized. Thus, in the present invention, the deployment speed of the airbag is increased and the deployment shape of the airbag is stabilized, improving occupant restraint performance.

A further aspect of the present invention is a side airbag device that is housed inside a vehicle seat and protects an occupant seated in the seat, comprising: an airbag that restrains the occupant by expanding and deploying; and an inflator that supplies expansion gas to the airbag. The airbag includes a pre-push chamber with the inflator stowed inside and a main chamber that is connected to the pre-push chamber and deploys toward the front of the vehicle. When the airbag is in the housed state, a first folded part is formed by the main chamber and a second folded part is formed by the pre-push chamber. A bracket holding the airbag and the inflator and secured to the seat frame of the seat is further provided, the bracket including a first surface facing the direction of travel (forward) of the vehicle. In addition, at least a portion of the second folded part close to the inflator is arranged on the first surface of the bracket.

In the above-described form of the present invention, a structure in which the first folded part and the second folded part are connected by a breakable sewn part is not adopted, but at least a portion of the second folded part near the inflator is arranged on the first surface of the bracket, so that in an initial stage of deployment of the airbag, the second folded part corresponding to the pre-push chamber will be deployed first with the front surface of the bracket as a reaction surface. Therefore, until the pre-push chamber is deployed to a certain extent, the main chamber (first folded section) does not expand significantly and remains close to the pre-push chamber. As a result, maintaining a favorable relative posture (positional relationship) between the main chamber and the pre-push chamber and their positional relationship with the bracket becomes possible.

The second folded part can be formed in a bellows-folded shape. The first folded part can be formed into a roll shape.

The sewn part preferably at least connects the outermost layer of the roll-shaped first folded part with the layer closest to the first folded part of the bellows-folded shape second folded part.

The sewn part preferably penetrates the roll-shaped first folded part. The sewn part penetrates the first folded part, thereby enabling the roll-shaped folded part to be reliably retained in the pre-deployed posture thereof.

The sewn part preferably penetrates the roll-shaped first folded part in a manner that is offset from the roll center. Having the sewn part penetrate the roll-shaped first folded part avoiding the center of the first folded part enables avoiding a situation that causes a delay in the deployment of the first folded part.

The sewn part preferably penetrates near the center of the roll-shaped first folded part if it is possible to avoid the outer sewing for forming the airbag cushion into a bag. Controlling the sewing position appropriately enables maintaining the posture of the folded part before deployment more reliably without causing unnecessary damage to the outer perimeter sewn part, while avoiding a situation in which deployment is delayed.

The sewn part preferably penetrates only the rolled part, except for the part folded in a Z-shape which mainly includes the pre-push chamber. This configuration allows the first and second folded parts to be connected to each other with appropriate strength, and avoids a situation of causing a delay in the deployment of the airbag.

The airbag and the inflator can be further provided with a bracket that retains the airbag and the inflator.

The bracket can include a first surface facing the direction of travel (forward) of the vehicle, and the first folded part and the second folded part can be configured to be arranged on the first surface of the bracket. Being arranged on the first "surface" does not mean being arranged on the "top" in the vertical relationship, but means leaning against, touching, facing, and the like of the surface.

The pre-push chamber and the main chamber preferably expand forwardly with the first surface of the bracket as a reaction surface.

In the specification and claims of the present application, the direction in which the occupant is facing (the direction of vehicle travel) when the occupant is seated in the seat in a normal posture is referred to as "forward" and the opposite direction is referred to as "rear", and the axis of the coordinates are referred to as the "front-rear direction". Moreover, when the passenger is seated in the seat in a regular posture, the right of the passenger is referred to as the "right direction," the left of the passenger is referred to as the "left direction," and the direction indicating the coordinate axis is referred to as the "left and right direction." In the left-right direction, a region on an occupant side from a side frame of the seat shall be referred to as "inside", and a region opposite from the occupant as viewed from the side frame shall be referred to as "outside". Similarly, when the passenger is seated in the seat in a regular posture, the head direction of the passenger is referred to as "up," the waist direction of the passenger is referred to as "down," and the direction indicating the coordinate axis is referred to as the "vertical direction."

The side airbag apparatus according to the present invention includes a type which is deployed on the door side of (outside) the seat, along with a type which is deployed on the vehicle center side of the seat. A side airbag device of a type which is deployed on the vehicle center side of the seat, for example, is referred to as a far side airbag, front center airbag, rear center airbag, and the like.

MODE FOR CARRYING OUT THE INVENTION

A side airbag device according to embodiments of the present invention will be described below with reference to the accompanying drawings.

Figure 1:
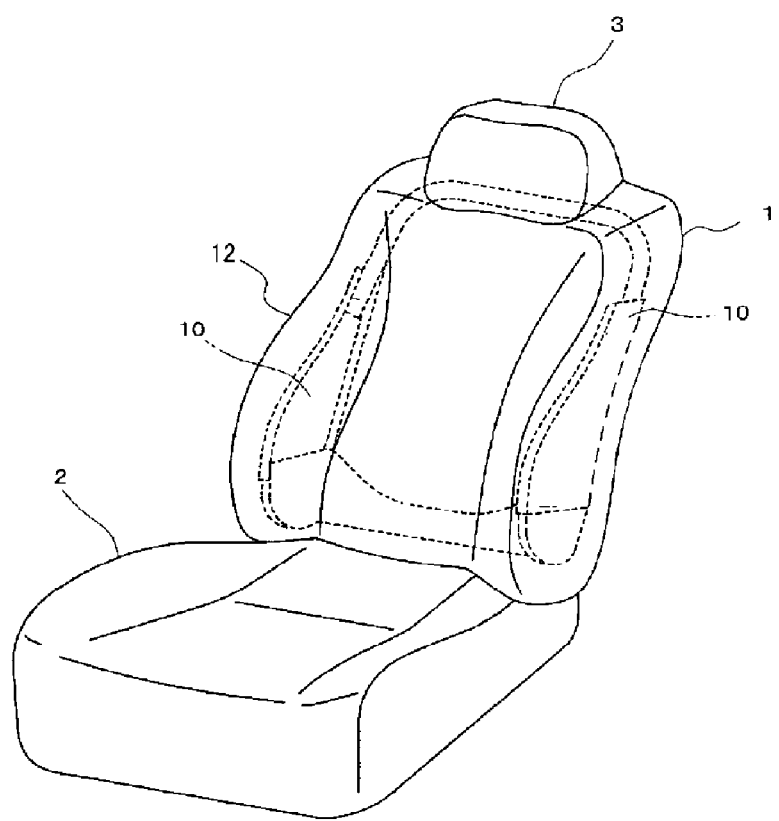
FIG. 1 is a perspective view primarily illustrating an external shape of a vehicle seat according to the present invention, with an illustration of a side airbag device omitted.
Figure 2:
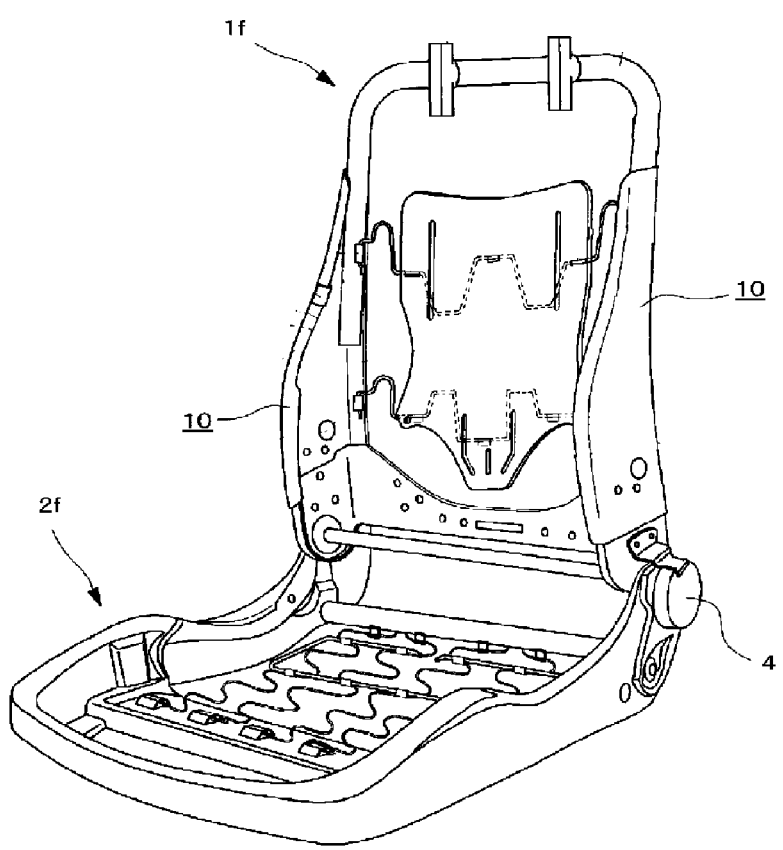
FIG. 2 is a perspective view illustrating an internal structure (seat frame) functioning as a framework of the vehicle seat illustrated in FIG. 1, with an illustration of the side airbag device omitted.
Figure 3:
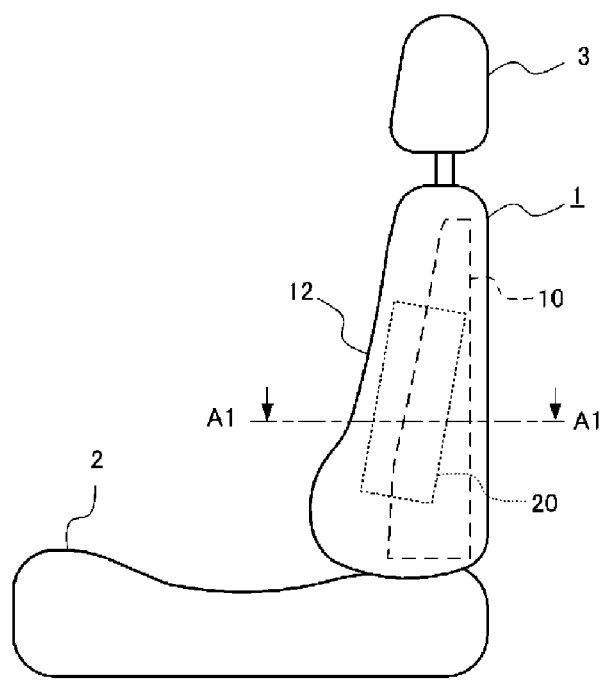
FIG. 3 is a schematic side surface view of the vehicle seat according to the present invention, schematically illustrating a condition where the side airbag device is stored therein, observed from the outside in the vehicle width direction.
Figure 3:
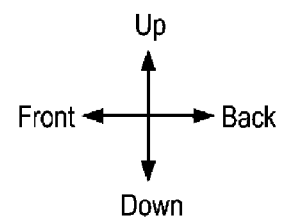

FIG. 1 is a perspective view primarily illustrating an external shape of a vehicle seat according to the present invention, with an illustration of an airbag device (airbag module) 20 omitted. FIG. 2 is a perspective view illustrating an internal structure (seat frame) functioning as a framework of the vehicle seat illustrated in FIG. 1, with an illustration of the airbag device (airbag module) 20 omitted herein as well. FIG. 3 is a schematic side surface view of the vehicle seat according to the present invention, illustrating a condition where the airbag device (airbag module) 20 is stowed on a side surface (near side) near a left side seat door as observed from the outside in the vehicle width direction.

As illustrated in FIG. 1 and FIG. 2, the vehicle seat in the present embodiment, when viewed as a part, is composed of a seat cushion 2 of a portion in which an occupant is seated; a seat back 1 forming a backrest; and a headrest 3 connected to the upper end of the seat back 1.

As illustrated in FIG. 2, a seat back frame 1f forming a skeleton of the seat is provided inside the seat back 1, a pad 16 (refer to FIG. 4) made of a urethane foam material or the like is provided on a surface and periphery thereof, and a surface of the pad 16 is covered with a surface skin 14 such as leather, fabric, or the like. A seating frame 2f is provided on a bottom side of the seat cushion 2. Similar to the seat back 1, a pad made of a urethane foam material or the like is provided on an upper surface and periphery thereof, and a surface of the pad is covered by the skin 14 (FIG. 4) such as leather, fabric, or the like. The seating frame 2f and the seat back frame 1f are connected via a reclining mechanism 4.

As illustrated in FIG. 2, the seat back frame 1f is configured into a frame shape by side frames 10 disposed laterally spaced apart and extending in the vertical direction, an upper frame connecting the upper ends of the side frames 10, and a lower frame connecting the lower ends thereof. The headrest 3 is configured by providing a cushioned component outside a headrest frame.

Figure 4:
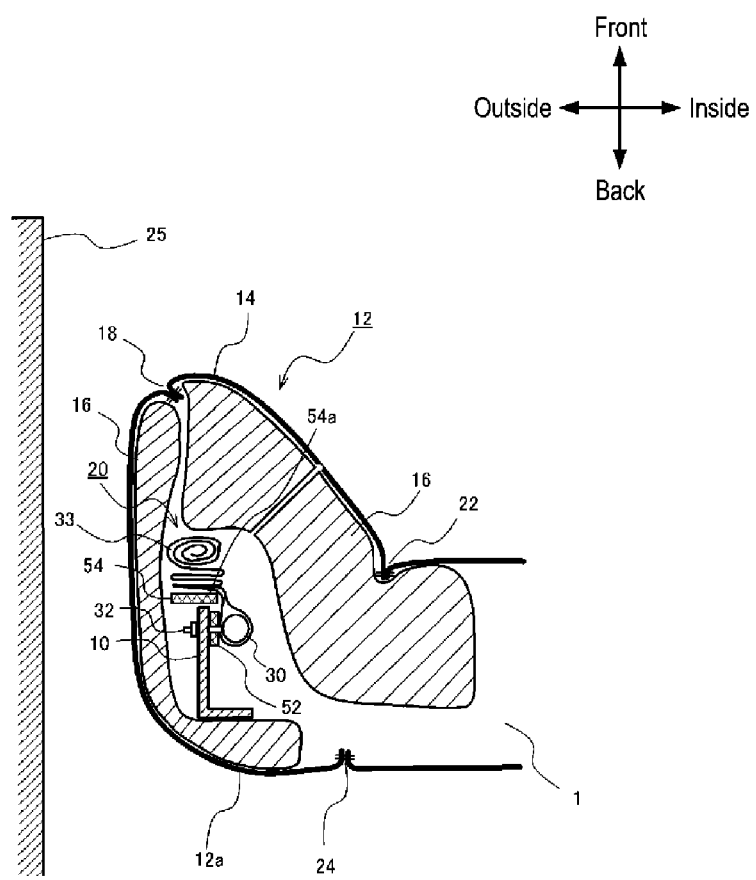
FIG. 4 is a cross sectional view illustrating the structure of the vehicle seat according to the present invention, corresponding to a part of a cross section in an A1-A1 direction of FIG. 3.

FIG. 4 is a cross sectional view illustrating the structure of the vehicle seat according to the present invention, corresponding to a part of a cross section in an A1-A1 direction of FIG. 3. The side frame 10 can be molded of resin or metal and, as illustrated in FIG. 4, can be formed into an L-shaped cross sectional shape or a U-shaped cross sectional shape. An airbag module (side airbag device) 20 is secured to the inside (seat center side) and front side of the side frame 10.

As illustrated in FIG. 4, the seat back 1 includes a side supporting part 12 which swells in the vehicle traveling direction (vehicle front) on a side part (end part) in the vehicle width direction. A urethane pad 16 is arranged inside the side supporting part 12, and the side airbag device 20 is stowed in a gap of the urethane pad 16. The side airbag device 20 includes: an airbag 33 that restrains an occupant when expanded and deployed; and an inflator 30 that supplies an expansion gas to the airbag 33.

Seams 18, 22, 24 of the skin 14 of the seat back 1 are interwoven and connected by sewing. Note that the front seam 18 is cleft when the airbag is deployed.

The compressed airbag 33 is secured to the side frame 10 via the brackets 52 and 54. The airbag 33 may be covered by a flexible cover made of fabric. Note that in FIG. 4, reference code 25 indicates a door trim.

The brackets (52 and 54) are provided with a first plate 54 that is a flat plate extending in a vertical direction and a second plate 52, through which two stud bolts 32 that are connected to the inflator 30 are inserted through, such that the second plate 52 is directly secured to the side frame 10. These types of brackets are generally arranged such that the first plate 54 and second plate 52 are orthogonal when viewed in a cross section perpendicular to the longitudinal direction, and the first plate 54 and the second plate 52 are connected to each other by welding or the like.

The first plate 54 of the bracket has a first surface 54a that faces the vehicle traveling direction, and the airbag 33 in a stowed state is arranged along the first surface 54a. Herein, when the long and thin compressed airbag 33 expands and deploys in the vehicle traveling direction, the first surface 54a of the first plate 54 is a reaction force surface, and thus the airbag 33 reliably and quickly deploys in a forward direction.

On the other hand, the second plate 52 of the bracket has a second surface 52a facing the occupant side, and primarily a portion of the pre-push chamber 36 of the airbag 33 is arranged on said second surface 52a.

Figure 5:
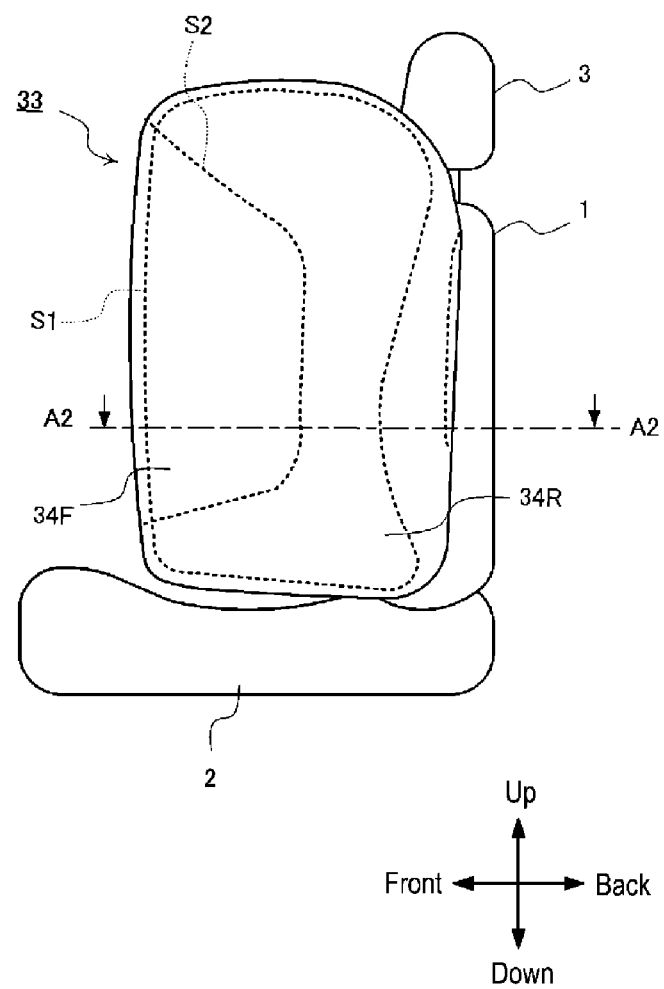
FIG. 5 is a schematic side view of the vehicle seat according to the present invention, illustrating a condition where the airbag is deployed as observed from the outside in the vehicle width direction.
Figure 6:
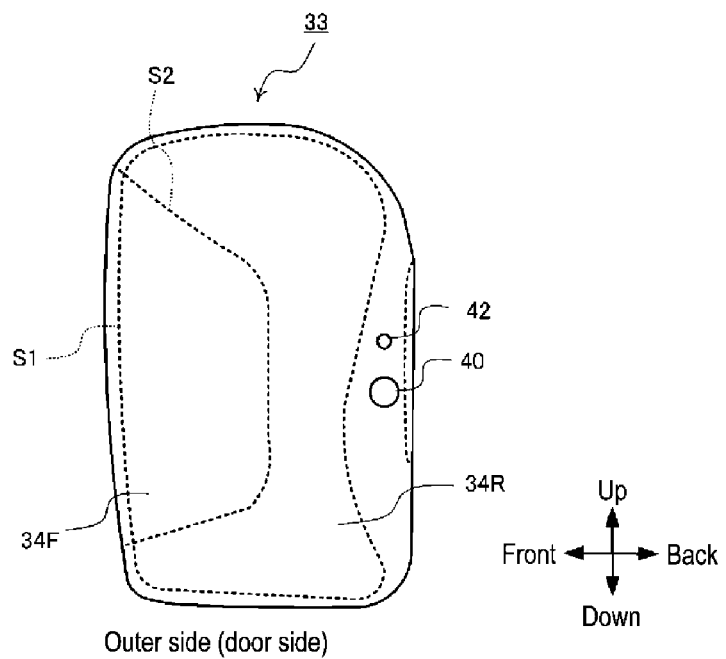
FIG. 6 is a side view illustrating an airbag structure that can be employed in the side airbag device according to the present invention, where (A) illustrates a view observed from the outside of the vehicle (opposite the occupant), and (B) illustrates a view observed from the inside of the vehicle (occupant side).
Figure 6:
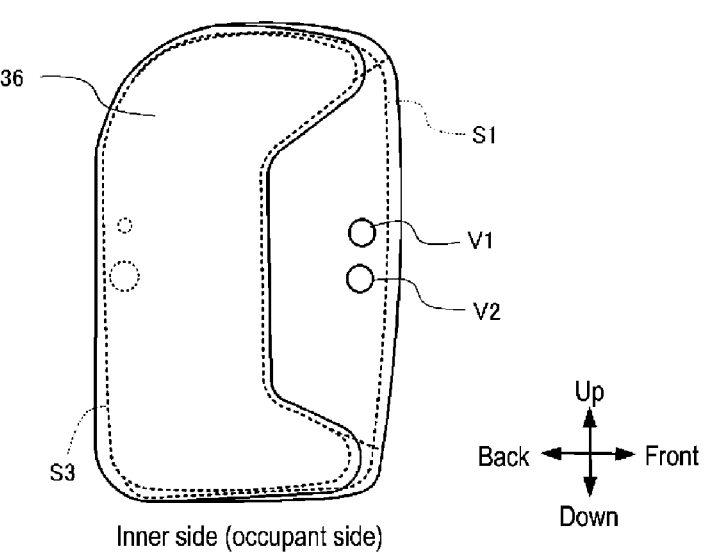

FIG. 5 is a schematic side view of the vehicle seat according to the present invention, illustrating a condition where the airbag is deployed as observed from the outside in the vehicle width direction. FIG. 6 is a side view illustrating the structure of the airbag 33, where (A) illustrates a view observed from the outside of the vehicle (opposite the occupant), and (B) illustrates a view observed from the inside of the vehicle (occupant side).

As illustrated in FIG. 5 and FIG. 6, the airbag 33 has a main chamber 34 that deploys toward the front of the side support portion 12; and a pre-push chamber 36 that deploys prior to the main chamber 34.

An internal vent hole (not shown) is provided in the partitioning part (boundary portion) between the main chamber 34 and the pre-push chamber 36, through which expansion gas flows from the pre-push chamber 36 to the main chamber 34.

Exhaust vents V1 and V2 are formed at the front end of the main chamber 34 for exhausting gas to the outside. Note that at least one exhaust vent for exhausting the gas to the outside can be formed on a front end part of the pre-push chamber 36, similar to the main chamber 34.

The main chamber 34 is partitioned into a forward chamber 34F and a rear chamber 34R, and expansion gas flows from the rear chamber 34R to the forward chamber 34F through a vent hole (not shown). Each chamber 34 (34F, 34R) and 36 are compartmentally formed by stitches S1, S2, S3.

Embodiment 1

Figure 7:
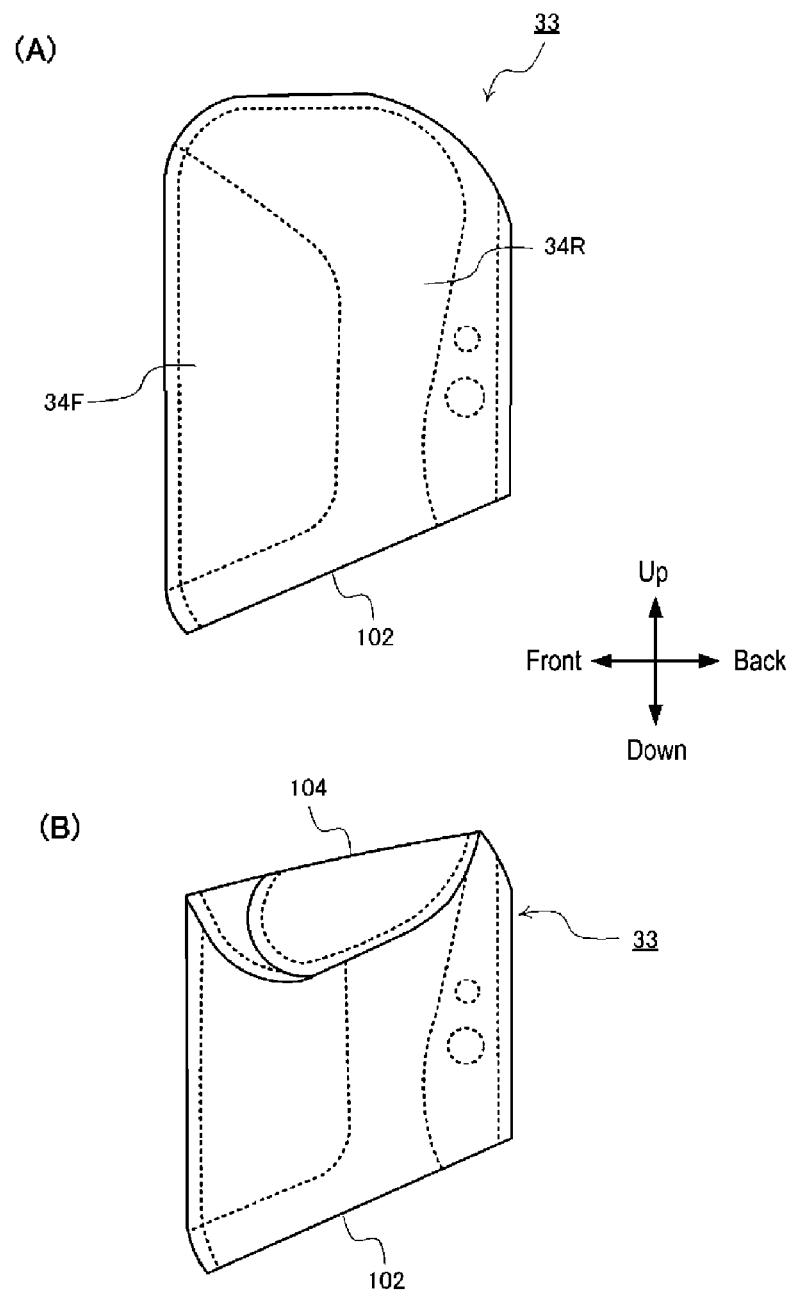
FIG. 7(A) and FIG. 7(B) are plan views illustrating a part of the manufacturing steps of the side airbag device according to embodiment 1 of the present invention.
Figure 8:
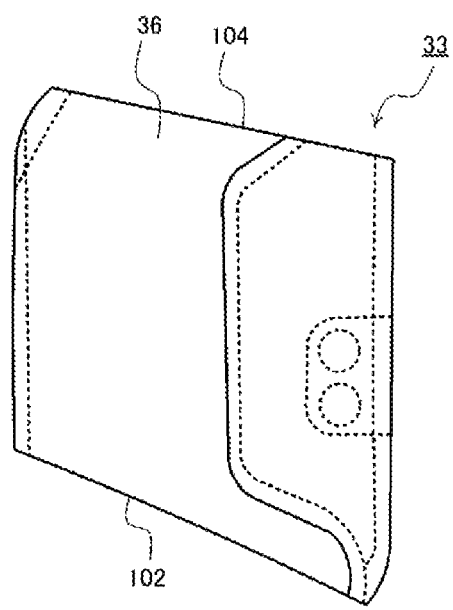
FIG. 8(A) and FIG. 8(B) are plan views illustrating a part of the manufacturing steps of the side airbag device according to embodiment 1 of the present invention.
Figure 8:
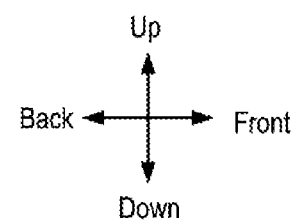
Figure 8:
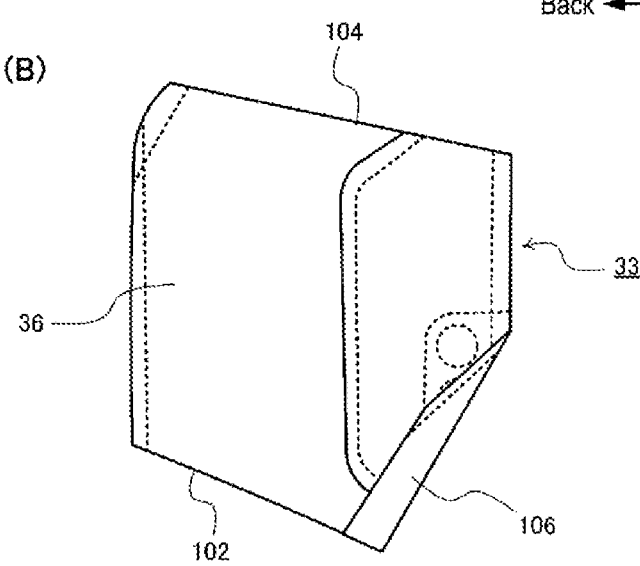
Figure 9:
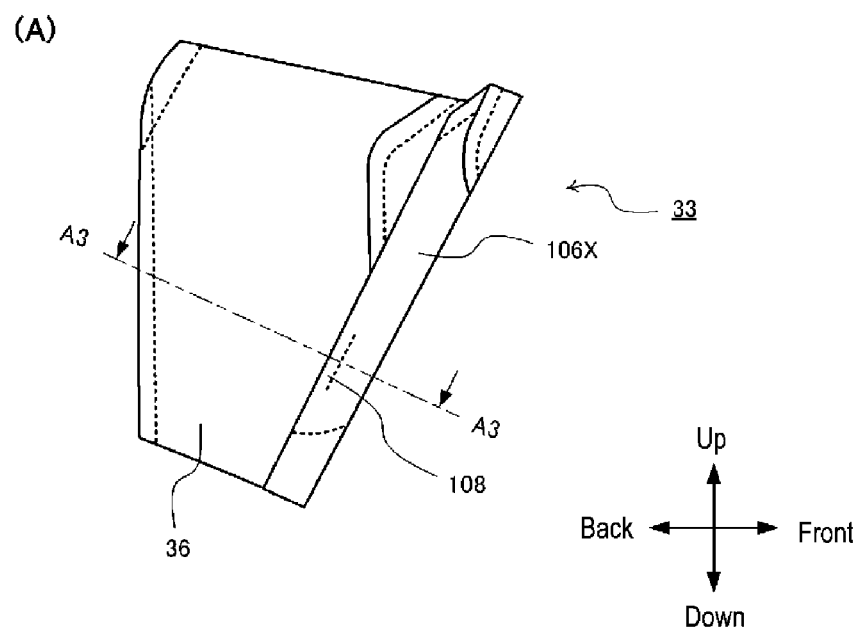
FIG. 9(A) is a plan view illustrating a part of the manufacturing steps of the side airbag device according to embodiment 1 of the present invention.
FIG. 9(B) is a cross-sectional view in the direction of line A3-A3 in FIG. 9(A).
Figure 9:
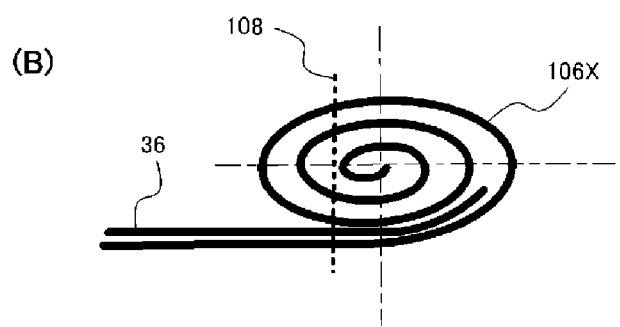
Figure 10:
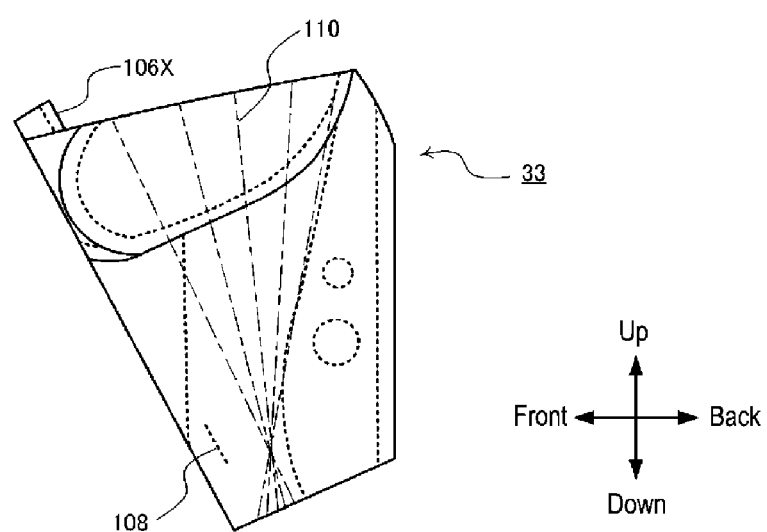
FIG. 10(A) and FIG. 10(B) are plan views illustrating a part of the manufacturing steps of the side airbag device according to embodiment 1 of the present invention.
Figure 10:
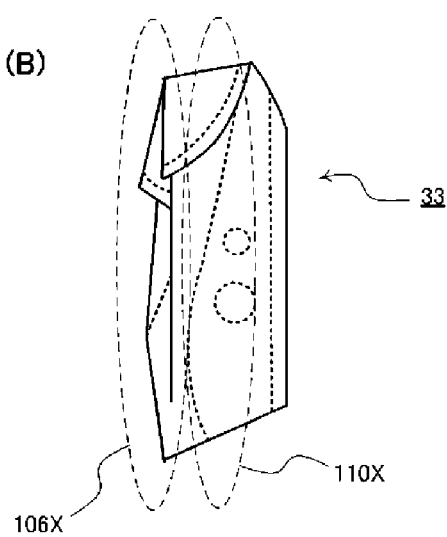

FIG. 7(A), (B), FIG. 8(A), (B), FIG. 9(A), and FIG. 10(A), (B) are plan views illustrating a part of a manufacturing process of a side airbag device according to the embodiment 1 of the present invention. In FIG. 7 to FIG. 10, the diagram of the inflator 30 is omitted for convenience of explanation. In the diagram, "front", "rear", "top", and "bottom" indicate the direction in which the airbag device is actually mounted on the seat (when deployed).

When folding the airbag 33, first insert the inflator 30 through the opening 40 of the pre-push chamber 36 and set the inflator 30 so that at least the gas discharge hole (not shown) is completely located inside the pre-push chamber 36.

In the present embodiment, for the airbag 33 set with the inflator 30, the lower portion of the airbag 33 is first folded upward along the fold line 102 extending generally in the front-back direction, as illustrated in FIG. 7(A).

Next, as illustrated in FIG. 7(*b*), the upper portion of the airbag 33 is folded downward along the fold line 104 extending generally in the front-to-back direction.

Thereafter, as illustrated in FIG. 8(A), the airbag 33 is flipped face down. Next, as illustrated in FIG. 8(B), rolling is started from near the forward lower corner of the airbag 33 toward the back diagonally upward, mainly corresponding to the main chamber 34, to form the initially rolled part 106.

Next, as illustrated in FIG. 9(A), the portion mainly corresponding to the main chamber 34 is completely rolled up to form the roll-shaped first folded part 106X. Furthermore, as also illustrated in FIG. 9(B), a sewn part 108 that can be ruptured during expansion and deployment of the airbag is formed so as to penetrate the first folded part 106X to connect the first folded part 106X (main chamber 34) to the end of the pre-push chamber 36 on the main chamber 34 side.

The sewn part 108 is formed by sewing the first folded part 106X in a slightly collapsed state with a sewing machine, extending parallel to the longitudinal direction of the first folded part 106X. Here, the sewn part 108 is formed to penetrate a position displaced from the center of the first folded part 106X.

Although the sewing position of the sewn part 108 has a certain degree of freedom, at least the outermost layer of the rolled first folded part 106X must be connected with the layer of the pre-push chamber 36 (second folded part 110X) closest to the first folded part 106X. Here, if the sewing of the sewn part 108 can be made so that, for example, the portion of the sewn part 108 that intrudes into the outer sewn parts of the main chamber and the pre-push chamber is as small as possible (and preferably does not enter the outer sewn parts), then the sewn part may be formed to penetrate at or near the center of the rolled first folded part 106X.

Next, as illustrated in FIG. 10(A), the airbag 33 is again flipped face down and the portion mainly corresponding to the pre-push chamber 36 is folded in a bellows shape along the fold line 110 to form the second folded part 110X. The state in which the airbag 33 is completely folded is illustrated in FIG. 10(B). The brackets 52 and 54 are attached to the airbag 33 that has been folded in this manner. Specifically, the stud bolts 32 of the inflator 30 are inserted into the second plate 52.

(Airbag Deployment Behavior)

Figure 11:
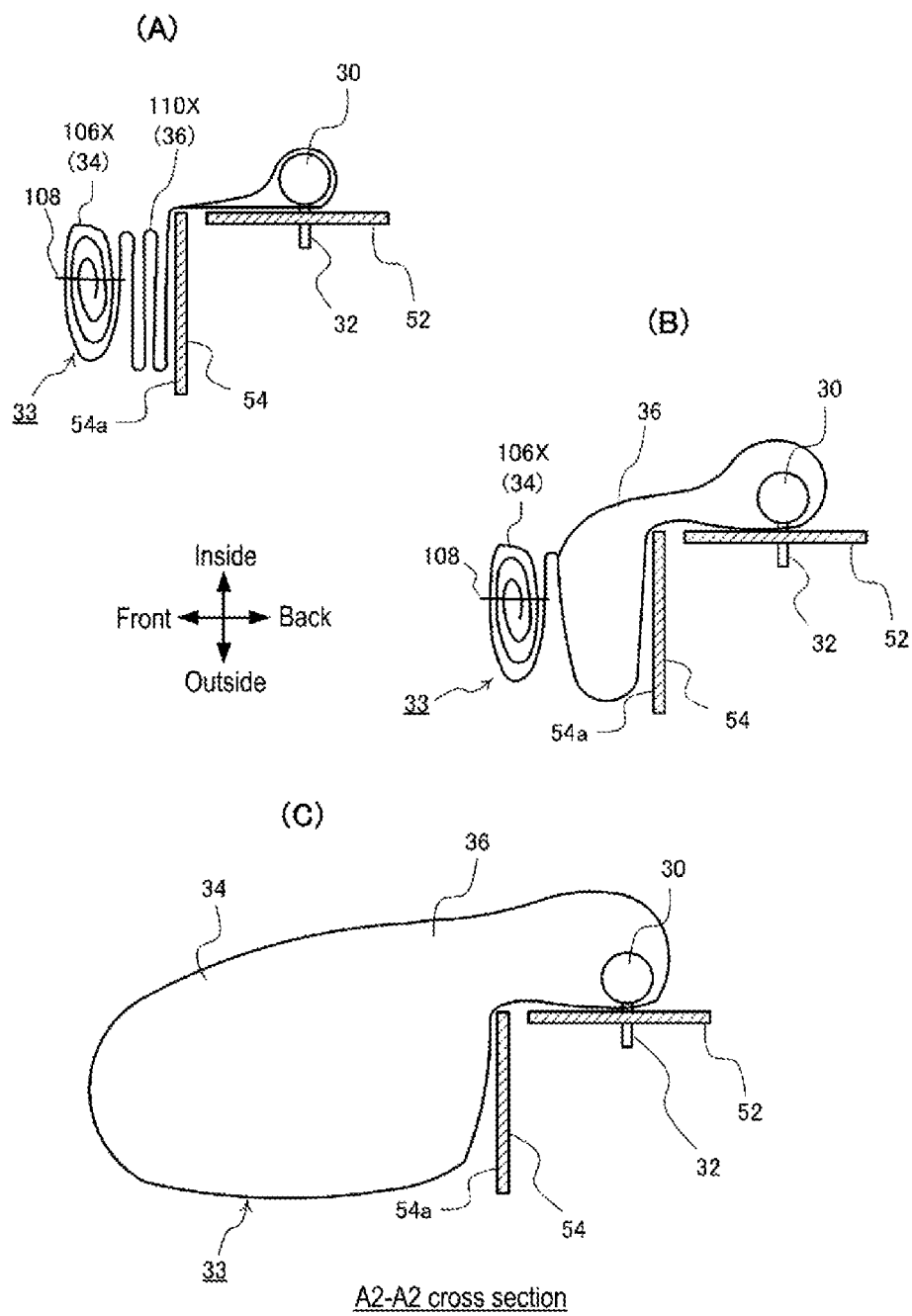
FIG. 11(A) to FIG. 11(C) are schematic cross-sectional views illustrating operation of the side airbag device according to embodiment 1 of the present invention, where (C) corresponds to a cross-section in the direction of line A2-A2 in FIG. 5.
Figure 12:
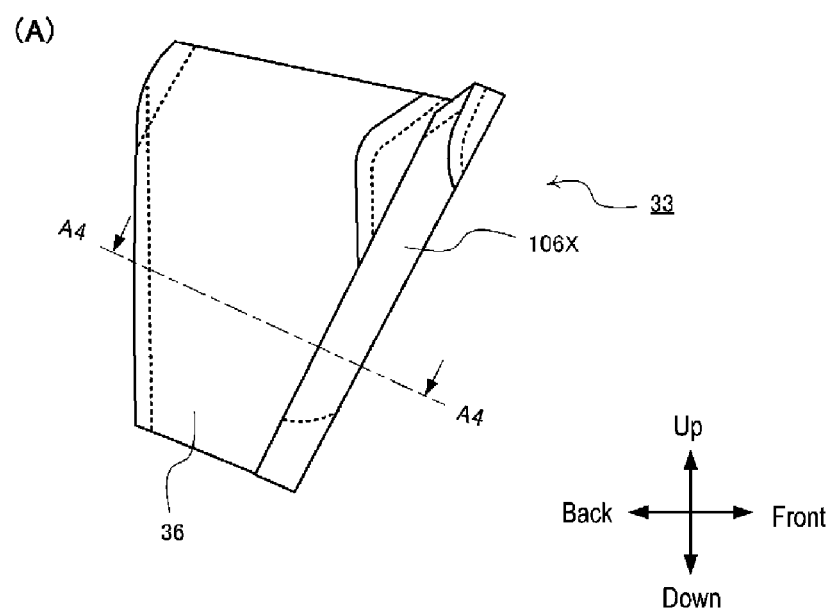
FIG. 12(A) is a plan view illustrating a part of the manufacturing steps of the side airbag device according to embodiment 2 of the present invention.
FIG. 12(B) is a cross-sectional view in the direction of line A4-A4 in FIG. 12 (A).
Figure 12:
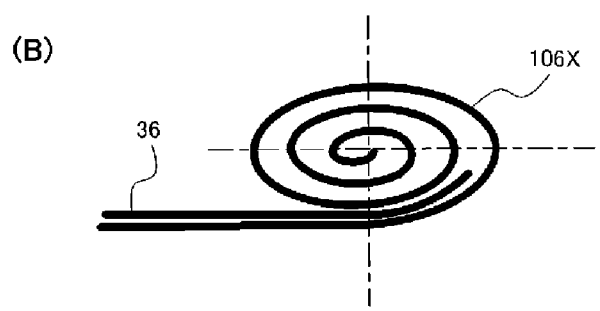

FIG. 11(A) to FIG. 11(C) are schematic cross-sectional views illustrating operation of the side airbag device according to the present invention, and FIG. 11(C) corresponds to the cross-section in the A2-A2 direction of FIG. 5. First, FIG. 11(A) illustrates the state in which the brackets 52 and 54 are set in the airbag device and before the airbag 33 is deployed.

In this state, the second folded part 110X, which is mainly made up of the pre-push chamber 36, is folded into a bellows shape (Z-fold). At this time, the sewn part 108 is not in this bellows-folded second folded part 110X, and only reaches the end of the main chamber side of the pre-push chamber 36, as illustrated in FIG. 9(B). When the airbag system is activated, the gas from the inflator 30 causes the pre-push chamber 36, which initially forms the second folded part 110X, to begin deployment. When the pre-push chamber 36 deploys, as illustrated in (B), the pre-push chamber 36 deploys with the front surface 54a of the bracket 54 as a reaction force surface and is shaped to push the first folded part 106X forming the main chamber 34 forward. At this time, the sewn part 108 has not yet been ruptured.

As the deployment of the airbag 33 further progresses, as illustrated in (C), the sewn part 108 is ruptured and the roll of the first folded part 106X is unrolled, causing the main chamber 34 to dramatically deploy forwardly.

In the present embodiment, the first folded part 106X formed mainly by the main chamber 34 and the second folded part 110X formed mainly by the pre-push chamber 36 overlap, preferably at a portion where the first folded part 106X formed mainly by the main chamber 34 and the breakable sewn part 108 is formed at the portion where the end of the first folded part 106X of the second folded part 110X formed by the pre-push chamber 36 overlaps with the end of the first folded part 106X. In this manner, the sewn part 108 is formed at the overlapping portion of the first folded part 106X and the second folded part 110X, so that at the stage (A) before the airbag 33 is activated, the first folded part 106X and the second folded part 110X are connected, and the two folded parts 106X and 110X can be can be treated as a single unit. In addition, the connection between the first folded part 106X and the second folded part 110X is not maintained more than necessary, which avoids a situation in which the deployment speed of the airbag 33 is reduced.

The main chamber 34 will remain connected to the pre-push chamber 36 until the point at which the pre-push chamber 36 starts to deploy during the initial stage of deployment of the airbag 33, or in other words, until the main chamber 34 starts to deploy (B). Therefore, the relative posture (positional relationship) of the chambers 34 and 36 with each other and with the bracket 54 can be favorably maintained. In other words, the position with respect to the bracket 54a that is used as a reaction force surface when deployed can be maintained in an appropriate state, and the reaction force surface can be effectively utilized.

As described above, the airbag device of the present embodiment stabilizes the deployment shape of the airbag 33 without inhibiting the rapid deployment speed of the airbag 33, thereby improving the occupant restraint performance.

Embodiment 2

Next, embodiment 2 of the present invention will be described with reference to FIG. 9 through FIG. 12. Embodiment 1 and embodiment 2 have many parts in common, and the same reference symbols are attached to the same or corresponding components, and duplicate descriptions are omitted.

In embodiment 1, the first folded part 106X and the second folded part 110X of the airbag 33 are connected by a breakable sewn part (108), but the sewn part (108) is not employed in embodiment 2.

Figure 13:
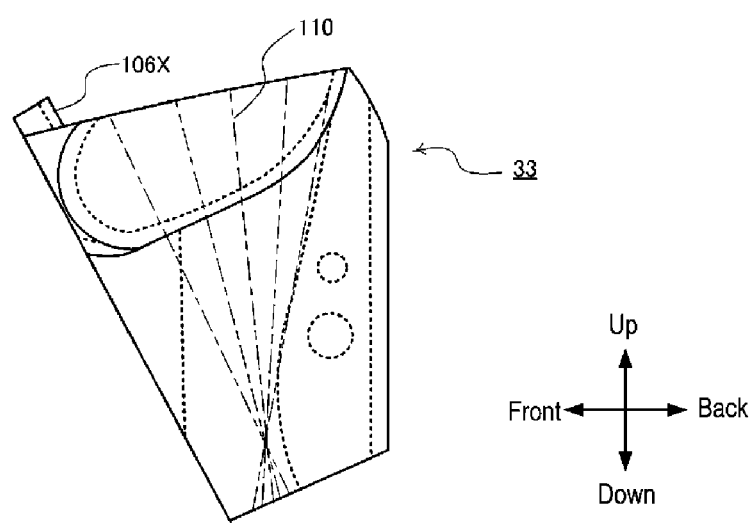
FIG. 13(A) and FIG. 13(B) are plan views illustrating a part of the manufacturing steps of the side airbag device according to embodiment 2 of the present invention.
Figure 13:
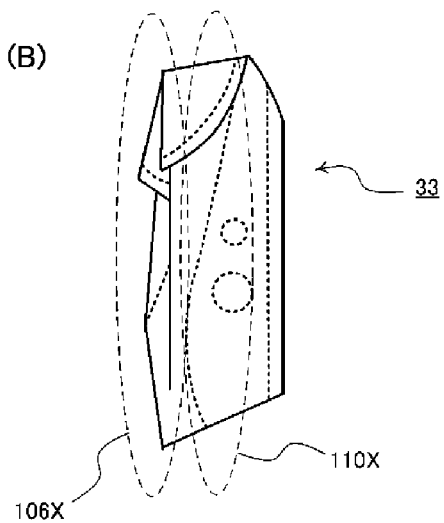

FIG. 12(A) and FIG. 13(A), (B) are plan views illustrating a part of the manufacturing process of the side airbag device. The manufacturing process (folding process) up to and including FIG. 12(A) is the same as in embodiment 1 illustrated in FIGS. 7(A) and (B) and FIGS. 8(A) and (B).

As in embodiment 1, the airbag 33 folded up to the state illustrated in FIG. 8(B) is then completely rolled up, mainly the portion corresponding to the main chamber 34, to form a roll-shaped first folded part 106X, as illustrated in FIG. 12(A).

Next, as illustrated in FIG. 13(A), the airbag 33 is flipped over and the portion mainly corresponding to the pre-push chamber 36 is folded in a bellows shape along the fold line 110 to form the second folded part 110X. The state in which the airbag 33 is completely folded is illustrated in FIG. 13(B). The brackets 52 and 54 are attached to the airbag 33 that has been folded in this manner. Specifically, the stud bolts 32 of the inflator 30 are inserted into the second plate 52.

Figure 14:
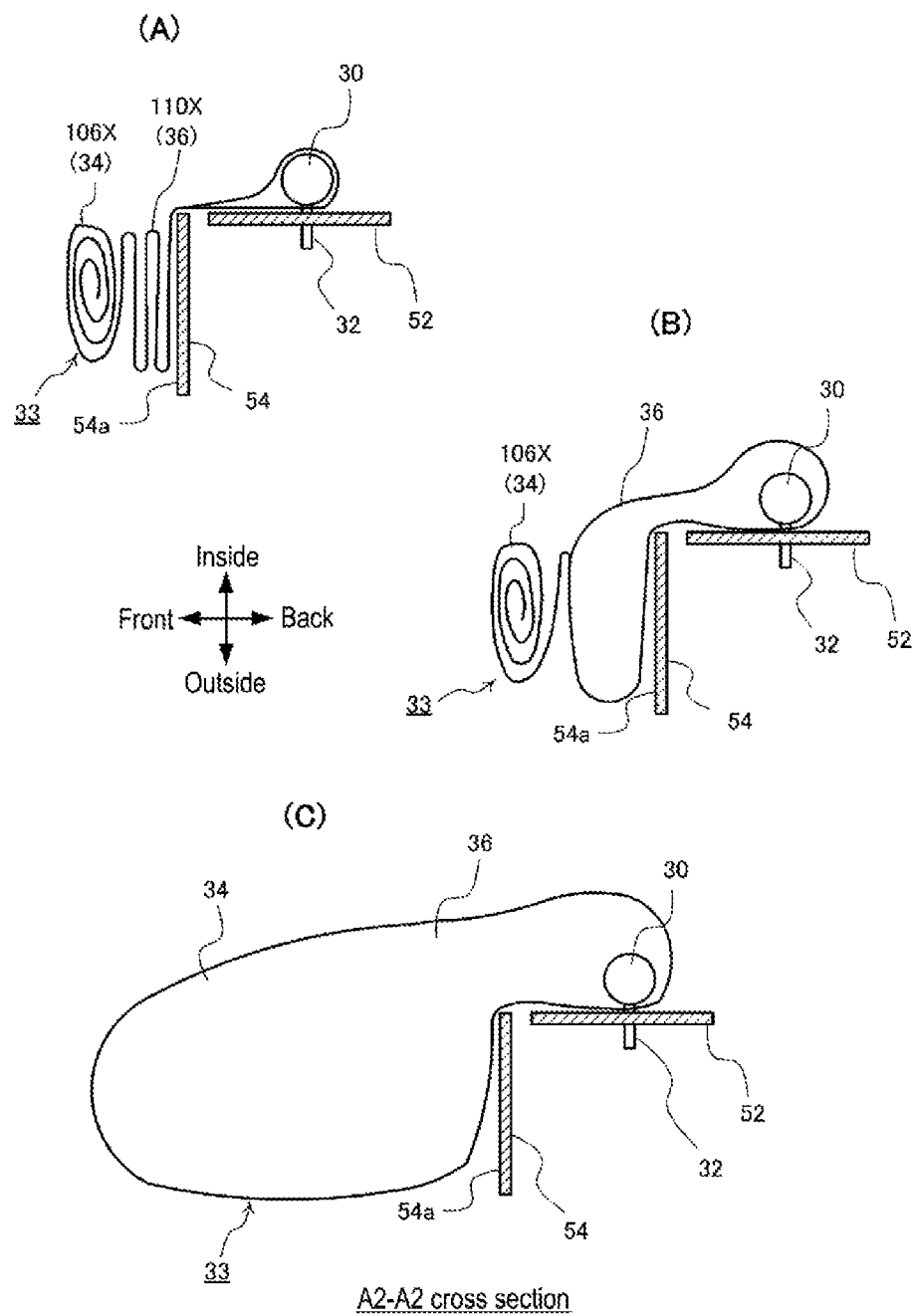
FIG. 14(A) to FIG. 14(C) are schematic cross-sectional views illustrating the operation of the side airbag device according to embodiment 2 of the present invention, where (C) corresponds to a cross-section in the direction of line A2-A2 in FIG. 5.

FIG. 14(A) to FIG. 14(C) are schematic cross-sectional views illustrating the deployment operation of the side airbag device of embodiment 2, and FIG. 14(C) corresponds to the cross-section in the direction of line A2-A2 of FIG. 5 FIG. 14(A) illustrates the state in which the brackets 52 and 54 are set in the airbag device and before the airbag 33 is deployed. In this state, the second folded part 110X, which is mainly made up of the pre-push chamber 36, is folded into a bellows shape (Z-fold).

When the airbag system is activated, the gas from the inflator 30 causes the pre-push chamber 36, which initially forms the second folded part 110X, to begin deployment. As illustrated in (B), the pre-push chamber 36 unfolds inwardly (toward the occupant) using the inner surface of the bracket 52 as a reaction force surface, and at the same time, the first folded part 106X forming the main chamber 34 unfolds forwardly using the front surface 54a of the bracket 54 as a reaction force surface.

Further, as the deployment of the airbag 33 progresses, the roll of the first folded part 106X is unrolled and the main chamber 34 is largely deployed forward, as illustrated in FIG. 14(C).

In the present embodiment, similar to embodiment 1, a structure in which the first folded part 106X and the second folded part 110X are connected by a breakable sewn part (108) as in embodiment 1 is not adopted, but at least a portion of the second folded part 110X close to the inflator is arranged on the front surface 54a of the bracket 54, so that in the initial stage of deployment of the airbag 33, the second folded part 110X corresponding to the pre-push chamber 36 will be deployed ahead of the front surface 54a of the bracket 54 as a reaction surface. Therefore, until the pre-push chamber 36 is deployed to a certain extent, the main chamber 34 (first folded part 106X) does not expand significantly and remains close to the pre-push chamber 34. As a result, this enables maintaining a favorable relative posture (positional relationship) of the main chamber 34 and the pre-push chamber 36 and their positional relationship with the bracket 54.

Although the present invention has been described with reference to embodiments, the present invention is not limited in any way to these embodiments, and can be changed as appropriate within the scope of the technical idea of the present invention. For example, while a side airbag on the near side has been predominantly mentioned in the embodiments described above, use is also possible with a far side airbag (surface on the far side from a vehicle door of a vehicle seat), in very small vehicles such as a single seat vehicle (irrespective of the presence of a door, a vehicle including parts with only one seat in a single row), and the like.

The invention claimed is:

1. A side airbag device that is housed inside a vehicle seat and protects an occupant seated in the seat, comprising:
    an airbag for restraining an occupant by inflating and deploying; and
    an inflator for supplying inflation gas to the airbag, wherein
    the airbag includes a pre-push chamber that contains the inflator inside and a main chamber that is connected to the pre-push chamber and deploys toward the front of the vehicle;
    when the airbag is in a housed state, a first folded part is formed including the main chamber, and a second folded part is formed including the pre-push chamber;
    at the portion where the first folded part and the second folded part overlap, a sewn part is formed that joins the first folded part and at least a portion of the pre-chamber; and
    the sewn part is configured to break during deployment of the airbag.

2. The side airbag device according to claim 1, wherein the second folded part is formed in a bellows-folded shape.

3. The side airbag device according to claim 2, wherein the first folded part is formed into a roll shape.

4. The side airbag device according to claim 3, wherein the sewn part at least connects the outermost layer of the roll-shaped first folded part with the layer of the bellows-fold shaped second folded part closest to the first folded part.

5. The side airbag device according to claim 3, wherein the sewn part penetrates the roll-shaped first folded part.

6. The side airbag device according to claim 5, wherein the sewn part penetrates the roll-shaped first folded part offset from the roll center.

7. The side airbag device according to claim 5, wherein the sewn part penetrates the roll-shaped first folded part in the vicinity of the central portion of the roll.

8. A side airbag device that is housed inside a vehicle seat and protects an occupant seated in the seat, comprising:
    an airbag for restraining an occupant by inflating and deploying; and
    an inflator for supplying inflation gas to the airbag, wherein
    the airbag includes a pre-push chamber that contains the inflator inside and a main chamber that is connected to the pre-push chamber and deploys toward the front of the vehicle;
    when the airbag is in a housed state, a first folded part is formed including the main chamber, and a second folded part is formed including the pre-push chamber;
    a bracket that retains the airbag and the inflator and is secured to the seat frame of the seat, where the bracket includes a first surface that faces the direction of travel of the vehicle, and at least a portion of the second folded part close to the inflator is arranged on the first surface of the bracket.

9. The side airbag device according to claim 8, wherein the pre-push chamber and the main chamber deploys forwardly with the first surface of the bracket as a reaction surface.

10. The side airbag device according to claim 8, wherein the second folded part is formed in a bellows-folded shape.

11. The side airbag device according to claim 8, wherein the first folded part is formed into a roll shape.

12. A manufacturing method of a side airbag device that is stowed inside a vehicle seat and protects an occupant seated in the seat, comprising:

a step of preparing a pre-push chamber that contains the inflator inside and a main chamber that is connected to the pre-push chamber and deploys toward the front of the vehicle;

a step of primarily folding the main chamber forming a first folded part;

a step of primarily folding the pre-push chamber forming a second folded part; and a step of forming a sewn part at the portion where the first folded part and the second folded part overlap that joins the first folded part and at least a portion of the pre-chamber, wherein the sewn part breaks during deployment of the airbag.

13. The manufacturing method of a side airbag device according to claim 12, wherein the second folded part is formed in a bellows-folded shape.

14. The manufacturing method of a side airbag device according to claim 12, wherein the first folded part is formed in a roll shape.

15. The manufacturing method of a side airbag device according to claim 14, wherein the sewn part at least connects the outermost layer of the roll-shaped first folded part with the layer of the bellows-fold shaped second folded part closest to the first folded part.

16. The manufacturing method of a side airbag device according to claim 14, wherein the sewn part penetrates the roll-shaped first folded part.

17. The manufacturing method of a side airbag device according to claim 16, wherein the sewn part penetrates the roll-shaped first folded part offset from the roll center.

18. The manufacturing method of a side airbag device according to claim 16, wherein the sewn part penetrates the roll-shaped first folded part in the vicinity of the central portion of the roll.

19. The manufacturing method of a side airbag device according to claim 12, wherein the side airbag device is provided with a bracket that retains the airbag and the inflator, the bracket includes a first surface that faces the direction of travel of the vehicle, and the first folded part and the second folded part are arranged on top of the first surface of the bracket.

\* \* \* \* \*